United States Patent [19]

Outous et al.

[11] Patent Number: 4,755,929
[45] Date of Patent: Jul. 5, 1988

[54] APPARATUS AND METHOD FOR RETRIEVING DATA IN THE FORM OF BINARY, MULTIPLE BIT, DIGITAL COMMUNICATION WORDS FROM A SYSTEM BUS

[75] Inventors: Ronald W. Outous, Seattle; Eugene P. McGuire, Woodinville, both of Wash.

[73] Assignee: The Boeing Company, Seattle, Wash.

[21] Appl. No.: 656,024

[22] Filed: Sep. 28, 1984

[51] Int. Cl.$^4$ .............................................. G06F 5/00
[52] U.S. Cl. ................................................... 364/200
[58] Field of Search ........ 364/710, 715, 200 MS File, 364/900 MS File; 235/310

[56] References Cited

U.S. PATENT DOCUMENTS

| | | | |
|---|---|---|---|
| 3,936,182 | 2/1976 | Sheikh | 355/14 |
| 3,987,290 | 10/1976 | Dickinson | 235/156 |
| 4,035,621 | 7/1977 | Kemp | 235/151.3 |
| 4,393,498 | 7/1983 | Jackson et al. | 371/20 |
| 4,513,419 | 4/1985 | Small | 371/29 |
| 4,583,180 | 4/1986 | Kmetz | 364/715 |

*Primary Examiner*—Gary V. Harkcom
*Assistant Examiner*—C. H. Lynt
*Attorney, Agent, or Firm*—Hughes, Cassidy & Multer

[57] ABSTRACT

Apparatus and methods for retrieving bipolar, standardized, digital communication words for test purposes from a source transmitting over a system bus, and displaying these communication words in an understandable format. The apparatus incluldes signal receiving ports coupled to the desired bus, which monitor and retrieve preselected communication words that are transmitted to one or more line replaceable units connected to that bus. Each incoming communication word contains an encoded label which is repetitively compared to a preselected label so that only those communication words having matched labels are retrieved for display. The retrieved word is decoded in either engineering or binary form and then displayed at an LCD window, printed out as hard copy, or made available to an IEEE-488 interface. Since the same label may be used to identify different communication words depending upon the transmitting source and bus, the apparatus includes an internal data base which utilizes the label and a transmitter identification code to generate data defining the selected communication word in proper engineering units and units of measure regardless of the system bus accessed. The apparatus includes signal input conditioning circuitry including two parallel comparators to convert the incoming bipolar signals into unipolar, NRZ data, data clock sync and gap signals used in downstream digital circuitry.

15 Claims, 12 Drawing Sheets

FIG. 1

| PURPOSE | PARITY | SIGN/STATUS MATRIX (SSM) | DATA FIELD | PAD OR DATA FIELD | SOURCE DESTINATION INDEX (SDI) | LABEL |
|---|---|---|---|---|---|---|
| BIT NO. | 32 | 31 30 | 29 28 27 26 25 24 23 22 21 20 19 18 17 16 15 | 14 13 12 11 | 10 9 | 8 7 6 5 4 3 2 1 |

FIG. 2

| LABEL CODE (OCTAL) | SOURCE EQUIPMENT IDENTIFICATION CODE (HEXADECIMAL) | PARAMETER | BCD | BNR |
|---|---|---|---|---|
| 011 | 02 | PRESENT POSITION-LONGITUDE | X | |
|  | 04 | PRESENT POSITION-LONGITUDE | X | |
| 034 | 02 | VOR/ILS FREQUENCY | X | |
|  | 06 | BAROMETER CORRECTION | X | |
|  | 11 | VOR/ILS FREQUENCY | X | |
| 042 | 02 | SET LONGITUDE | X | |
|  | 04 | SET LONGITUDE | X | |
|  | 20 | SET LONGITUDE | X | |
|  | A4 | SET LONGITUDE | X | |
| 215 | 06 | IMPACT PRESSURE | | X |
|  | 1A | IMPACT PRESSURE | | X |
|  | 29 | N1 ACTUAL | | X |
|  | 29 | EPR ACTUAL | | X |

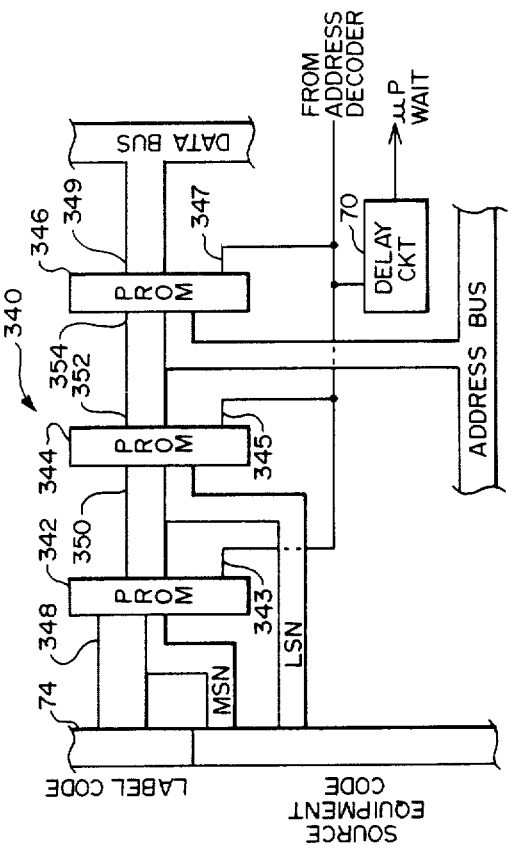

APPARATUS AND METHOD FOR RETRIEVING DATA IN THE FORM OF BINARY, MULTIPLE BIT, DIGITAL COMMUNICATION WORDS FROM A SYSTEM BUS

BACKGROUND OF THE INVENTION

1. Technical Field

The present invention relates generally to apparatus and methods for the receipt of digital data, and more particularly to apparatus and methods for verifying the operation of digital components which communicate over a bus network wherein the identity of the transmitting device together with data encoded in the transmitted communication are used to convert the communication into an understandable format, such as for example, an engineering notation format.

2. Background of the Art

Many modern electronic systems are composed of digital subsystems in communication over one or more buses for the exchange of digital information. These digital subsystems may be adapted to receive, compute and transmit various operating parameters within the system. The automobile, for example, utilizes various sensing means which measure among other things air temperature, engine speed, and atmospheric pressure, and then transmits this data in digital form to a central computer wherein the data is processed and then transmitted to various receiving units at the automobile engine to control the proper fuel/air mixture entering the automobile carburetor.

On a much wider scale, the modern jet aircraft requires the interchange of numerous operating parameters, such as for example, air speed, altitude, and heading, which are relayed to one or more computing units to be processed and then transmitted to other subsystems within the aircraft. Information exchanged within the aircraft is handled by individual control and information systems dedicated to performing specific tasks onboard the aircraft, such as for example, the air data system comprising an air data computer which receives data from various sensors around the aircraft, and then transmits the processed data via a digital bus network to other receiving units interfaced with the air data bus.

These control and information systems form integrated information systems for safe operation of the aircraft, interfacing not only with each other, but with the flight crew operating the aircraft. Each system includes a transmitting source and one or more receivers, also referred to as line replaceable units (LRU's), the transmitter and receivers interconnected by a common bus for the transfer of the digital data. The data is transferred in the form of encoded words which contain data defining various operating parameters of the aircraft, e.g., air speed, altitude, each word containing an encoded label to assist in identifying the data to the receiving LRU's. Sometimes it is desirable to access these systems for test purposes in order to read the data transferred therein; therefore conventional test sets have been developed which may be interfaced to specific system buses for this purpose. Often however, the same label may be used in different systems to identify different operating parameters transmitted therein; and, therefore decoding of the communicated words by the test set for display in an easily understandable format is impossible using label data only.

The multibit digital communication word commonly used in avionic systems is specified in the Mark 33 Digital Information Transfer System (DITS) published by Aeronautcal Radio, Inc., of Annapolis, Md., as ARINC specification No. 429-7, January 1983, and referred to herein as the ARINC 429 word. A typical binary coded decimal ARINC word, illustrated in FIG. 1, comprises 32 bits, including label data bits 1 through 8, source/destination (SDI) bits 9 and 10, data field bits 11 through 29, sign status matrix (SSM) bits 30 and 31, and a parity bit 32. The function of the various bit groups comprising the 32 bit ARINC word are as follows: the label bits identify the particular operating parameter described by the 32 bit word, for example altitude or air speed; bits 11 through 28 represent the numerical value of that operating parameter, for example if altitude represents the operating parameter then bits 11 through 29 represent the numerical value of that altitude. source/destination index bits 9 and 10 may be utilized to differentiate between two or more LRU's reading the same label; however it should be noted that some binary words cannot have an SDI because more than eighteen bits (bits 11 through 29) are needed for proper resolution of the data field. The remaining bits provide secondary information which will be discussed in further detail hereinafter.

Encoding and decoding of ARINC words under the correct label is accomplished by reference to the ARINC specification. Referring now to FIG. 2 there is shown a portion of the ARINC specification listing the label code in octal format, the source equipment code in hexadecimal format, and the operating parameters represented thereby. It should be appreciated that proper identification of the operating parameters under the ARINC 429-7 specification requires both the source equipment identification code as well as the label code. Referring particularly to label code 034, it can be seen that label code 034 together with source equipment code 02 identifies the operating parameter VOR/ILS frequency represented in units of hertz, whereas label code 034 together with source equipment code 06 identifies a barometric correction represented in units of millibars. Therefore it can be seen that one label code may represent two entirely different operating parameters depending upon the particular transmitting source and system bus. Since the label code is the only portion of the ARINC word which identifies the particular operating parameter transmitted over a system bus, conventional test sets were programmed to receive and display data from only one source or an assumed source. When data from another system utilizing a different transmitting source needed to be analyzed, another test set programmed to receive and display data from that transmitting source was used.

Apparatus for transmitting and receiving data over a system bus utilizing digital signals formatted in standardized multibit words for testing the exchange of digital information within the system, was disclosed in an application by T. Jackson et al entitled "Method and Apparatus for Testing Systems That Communicate Over Digital Buses by Transmitting and Receiving Signals in the Form of Standardized Multibit Binary Encoded Words", Ser. No. 227,371, filed in the United States Patent and Trademark Office on Jan. 22, 1981, now U.S. Pat. No. 4,393,498, the contents of which are incorporated herein by reference in their entirety. The test set disclosed in the Jackson application was directed towards formulating, transmitting and receiving inter-LRU digital communications in the form of communication words, and then displaying these words to a human operator in an understandable form, such as engineering unit format; an engineering unit comprising a decimal number as opposed to binary 1's and 0's which must be converted to another form for rapid understanding by a human operator. The inter-LRU digital communication word used in the aforesaid Jackson patent was defined by the ARINC 429-3 specification, published Dec. 15, 1979. Under the ARINC 429-3 specification, each label was assigned only one operating parameter. Therefore the label data contained in the ARINC word was sufficient to completely identify the operating parameter therein. Due to subsequent changes in the ARINC specification beginning with ARINC specification 429-4, label data was utilized to define one or more operating parameters requiring the user to specify to the test set manufacturers the assignment of one operating parameter to a label. Unfortunately, these dedicated test sets were usable only with those system LRU's which were programmed in accordance with the label assignments of the manufacturers.

The data signals transmitted over the bus network between LRU's are in the form of voltage differentials which in accordance with ARINC specifications comprise bipolar signals of plus or minus 5 volts, +5 volts representing logical 1 and −5 volts representing logical 0. Due to the location of the transmitting and receiving units throughout the aircraft, the bus lines used to transmit these digital signals are susceptible to the pickup of unwanted extraneous electrical signals (noise) from other electrical components in the aircraft, such as from generators motors, etc., which tend to distort and obscure these bipolar electrical signals, and if severe enough can cause the transmission of erroneous data. Conventional methods for reducing noise pickup includes shielding the signal transmission cables as well as utilizing a shielded twisted pair so that the common noise picked up by the lines is eliminated.

The frequency at which the digital data is transmitted over the bus network may be at separate discrete levels. The electronic circuitry receiving these transmissions for transfer to other digital subsystems must be synchonized to the frequency of the transmission source. Under the ARINC specification, data transmission must be at one of two frequencies, either a low speed transmission rate of 12.5 kilohertz (KHz) or a high speed transmission rate of 100 KHz. In conventional apparatus it is necessary that the operator determine the data bus transmission rate and manually select the corresponding frequency so that the data will be properly interpreted at the test set unit. If the operator is unable to determine the transmission frequency, the data will be received in an unintelligible form, if at all.

Therefore what is needed is an apparatus and method which can be utilized to receive, identify, and convert digital data transmitted over a system bus into an understandable format by utilizing both label and source equipment identifiers to electronically define and present the operating parameter in engineering units. There is also needed a method and apparatus for reducing the unwanted noise introduced into the the digital data during transmission between the various LRU's. In addition there is also needed an apparatus and method for automatically determining the frequency of digital data transmission and then timing the associated circuitry to receive that data.

SUMMARY OF THE INVENTION

Accordingly, it is a general aim of the present invention to provide improved apparatus and method for verifying the operation of digital components which access a bus network by converting a preselected portion of the data transmitted over the bus to engineering notation or to a binary format, for presentation by an LCD display or printer included therein, or for access by IEEE-488 interface circuitry. The apparatus and method is characterized by its flexibility for use with different transmitting sources, improved common mode noise rejection and by circuit timing pulses outputs utilized by downstream circuitry which are automatically synchronized to the data transmission frequency.

In one of its more detailed aspects, it is an object of the present invention to provide an improved apparatus and method for receiving data in the form of binary, multiple bit digital communication words received from a system bus. The computer controlled apparatus includes an input processor for retrieving a preselected communication word from those received communication words. The communication word is retrieved when a portion of the communication word comprising the label matches a preselected label code entered at the apparatus. Conversion of the retrieved word into engineering notation under the control of a binary to engineering conversion processor, including a data base therein, is accomplished by accessing the data base to provide data defining the communication word in engineering notation. The data is accessed by means of preselected inputs which include the label code corresponding to the retrieved label field and a source code identifying the data transmitting source. After the data is defined in binary or in engineering notation, it is presented by an output processor for either visual display or printout in alphanumeric form, or retrieval by IEEE 488 interface circuitry.

The data base comprises a plurality of memory devices, such as programmable read only memories (PROMs), which are addressed by a combination of the label code and source code. Because the label/source address may often exceed the address capabilities of any one of the memory devices by itself, the memory devices are cascaded so that the data outputs of a preceding memory device provide a portion of the address inputs to a succeeding memory device Additional address inputs are provided by a portion of the label/source address as well as address inputs from the computer. The output from the last cascaded memory device provides the engineering notation defining data for the retrieved communication word.

The engineering notation defining data utilized in the exemplary form of the present invention may be common to more than one label/source code input. Therefore those label/source addresses which are common to engineering notation defining data are collated by assigning to that common data an identification number which is programmed into all but the last memory device at the corresponding label/source address input. These identification numbers are used to address the engineering notation defining data contained in the last memory device.

It is a further and more detailed object of the present invention to reduce the effect of common mode noise contained in a two input bipolar signal comprising the digital communication words, by utilizing a first comparator and a second comparator having positive and negative input terminals respectively, and a first means and a second means for scaling the signal voltages fed to each comparator. The first scaling means is connected to the positive input of the first comparator and to the negative input of the second comparator. The second scaling means is connected to the negative input of the first comparator and to the positive input of the second comparator. The outputs of the first and second comparators are connected to means, such as a flip flop, for converting the comparator outputs into a unipolar signal.

It is another object of the present invention to provide a timing signal automatically synchronized to either of two communcation word input frequencies. The timing signal is obtained from the voltage storage means of a storage timing circuit. The resistor portion of the timing circuit utilizes resistors which are sized to prevent significant discharge of the voltage storage means between successive signal pulses of the data clock which is derived from the received communication word. A device determining the transmission rate of the communication pulses bypasses a predetermined portion of the voltage divider when the frequency of the communication word pulses is at the higher of the two values, thereby preventing significant discharge of the voltage storage means until the end of the communication word.

DESCRIPTION OF THE DRAWINGS

These and other objects and advantages of the present invention will become more readily apparent upon reading the following detailed description and upon reference to the attached drawings in which:

FIG. 1 is a diagrammatic representation of a typical 32 bit ARINC word;

FIG. 2 is a table containing label codes, source equipment codes and operating parameters taken from ARINC specification 429-7.

FIG. 10 is a diagrammatic representation of the 8 bytes of engineering notation defining data;

FIG. 11 is a block diagram of data base circuitry including delay circuitry;

Figure 3:
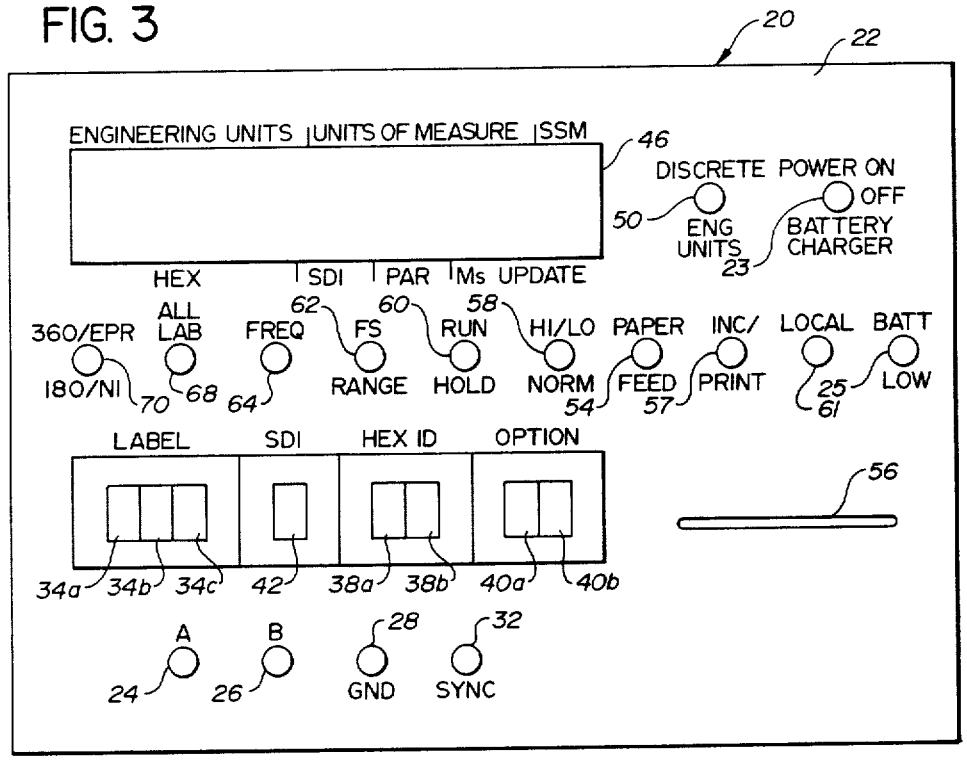
FIG. 3 is a drawing of the front panel of a test set including control switches and display window for interface with an operator.

While the present invention is susceptible of various modifications and alternative forms, specific embodiments thereof have been shown by way of example in the drawings and herein will be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

There is provided in accordance with the present invention an apparatus and method for receiving digital data transmitted over a common bus in the form of communication words including a reference label therein, selecting certain of those words for later use by comparison with a preselected reference label, and then accessing data to define the selected words in a communicable format, such as in engineering notation, for visual display or other use. Broadly the invention may be described by first referring to the apparatus illustrated in FIG. 3 comprising a test set generally indicated at 20, including a control panel 22 containing a plurality of human actuated switches for accessing the digital data transmitted over the bus network, and an LCD window for displaying that data in the desired form. External power is supplied to the unit by shifting a three position toggle switch 23 from the "off" to the "on" position, the third position defining a battery charger position used to supply a trickle charge to an 8 volt internal battery (not shown) used to supply power to the device when external power is not available, the state of the charge of the battery indicated by battery low light 25. Access to the digital bus network is through ports 24 and 26, labelled A and B respectively, comprising plug-in receptacles for the receipt of a twisted pair shielded cable; a ground input 28 is utilized to provide the ground connection from the cable shielding. An electrical pulse synchronized with the retrieval of each communication (ARINC) word is provided at SYNC port 32 in order to trigger an oscilloscope, logic state analyzer or other similar device. In order to retrieve data defining the desired operating parameter, e.g., Present Position-Longitude, and to insure the parameter is displayed in the proper engineering notation, there are provided thumbwheel switches 34a, 34b, 34c for entering label code in octal form and converting it to binary, as well as thumbwheel switches 38a, 38b for entering source equipment identification code in hexadecimal and converting it to binary. The entered label code is converted into an 8 bit binary input and compared to the 8 bit binary label code included in each 32 bit ARINC word transmitted over the system bus and accessed by test set 20 through input ports 24, 26. When a match occurs between the selected label and the label transmitted over the system bus, the 32 bit ARINC word is retrieved by downstream circuitry in a manner to be described later. In addition, the 8 bits of label code as well as the 8 bits of source equipment code are input to an internal data base which generates eight data bytes used to convert the received ARINC data into proper engineering notation for displaying the selected ARINC word.

As discussed previously, certain operating parameters are not included as part of the ARINC specification and therefore may or may not be included as part of the data base. In this case, specific portions of program memory other than the data base are used to store the data needed to define the particular engineering notation of the selected label. Individual programs are accessed by option thumbwheel switches 40a, 40b.

In order to distinguish data intended for one of a plurality of receivers present on a system bus reading the same label code, a source destination index thumbwheel switch 42 is used to input a code to address software to distinguish similar receiving LRU's.

A liquid crystal display (LCD) window 46 provides a visual readout of the digital data in either engineering notation or in discrete (binary) form as selected by toggle switch 50; discrete form defined as logical 1's and 0's or their hexadecimal equivalent. The LCD window 46 is sectionalized internally to display the data in two rows, the upper row from left to right including sections for the display of engineering units, units of measure, such as for example, megahertz when the operating parameter VOR/ILS frequency is selected, and sign status matrix; the lower row from left to right including, the hexadecimal equivalent of the 32 bit ARINC word, the source destination index entered at thumbwheel 42, the parity bit, and the time in milliseconds between successive updates of the selected ARINC label.

Referring now to the remaining switches on control panel 22, a local switch 61 is provided for placing test set 20 under the control of IEEE-488 circuitry; a paper feed switch 54 is provided for manual paper feed of a printout providing a hard copy at slot 56 of the data displayed at window 46; an increment/print switch 57 is provided to activate a printing function when switch 57 is in the print position, or to increment data across window 46 when switch 57 is in the increment position and the proper option code has been entered at thumbwheel switches 40a, 40b; a high-low/normal toggle switch 58 is provided to capture the highest and lowest values of data retrieved; and a run/hold toggle switch 60 is provided which, in the hold position, places the data in a freeze frame mode at display window 46. Additional switches include a full scale range switch 62 provided for displaying the full scale range of the data currently selected at test set 20; a frequency switch 64 is provided for displaying the frequency at which data enters input ports 24, 26; and an all label switch 68 is provided for displaying all labels received at inputs 24, 26 of test set 20. Also included is a combination two position toggle switch 70 provided for either selecting data defining EPR or N1 engine operating parameters (the selection of which is dependent upon manufacturer's specifications), or for selecting data defining full scale range values of 0° to ±180° or 0° to 360° depending upon which range is more useful to the operator when receiving data measured in angular degrees.

Figure 4:
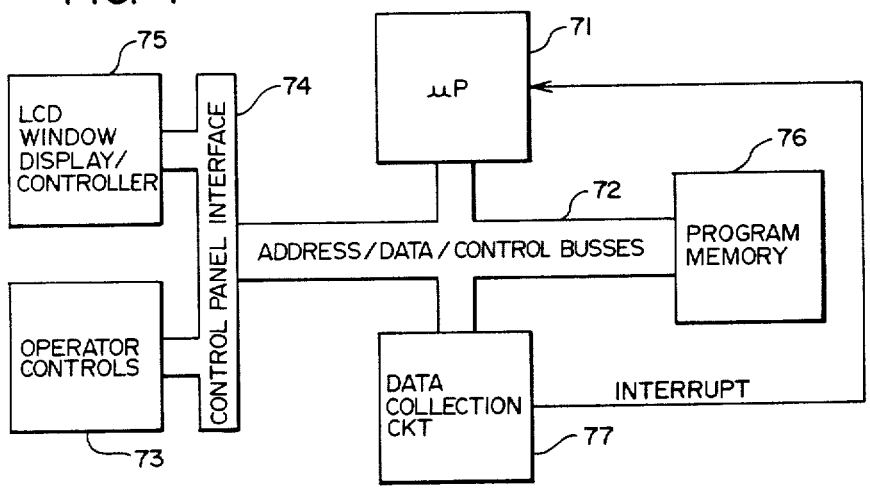
FIG. 4 is a block diagram illustrating the principal components of the test set circuitry.

Referring now to the block diagram in FIG. 4, operation of test set 20 is controlled by a microprocessor based microcomputer 71 interconnected via address, data, and control buses 72 to input devices, stored programs, and interface circuitry which allow test set 20 to interact with an operator via control panel 22, and to communicate with the data buses that interconnect the LRU's over the bus network. The address/data/control buses 72 are interfaced with operator controls 73 including, for example, label and source equipment code inputs, EPR/N1 select switches, via control panel interface 74. Buses 72 are also connected to LCD window display and display controller 75 including therein LCD window 46 of control panel 22 (FIG. 3). Controller 75 formats data processed by microprocessor 71 for display at window 46. The communications between microprocessor 71, operator controls 73, LCD display controller 75 and program memory 76 are known to those skilled in the art and will not be discussed further herein.

The reception of the identified communication words, comprising in this embodiment the 32 bit ARINC word, is performed by data collection circuitry 77 under the control of microcomputer 71 and program memory 76. Data processing is performed on microcomputer 71, and by interrupts when received word processing is triggered by data collection circuitry 77. Data collection circuitry 77 is connected to an interrupt input of microcomputer 71 which is triggered by reception of a valid communication word present on the system bus network via input ports 24, 26. When interrupted, microprocessor 71 is vectored to a specific location in memory where there is contained an interrupt service routine for retrieving the selected communication words from data collection circuitry 77 and for storing those words at program memory 76, for eventual display at window 46 as well as transmission to other selected locations such as a printer or an IEEE-488 interface to be discussed in further detail herein.

Data collection circuitry 77 functions to accept binary encoded word labels that have been previously chosen by the operator, and to selectively retrieve the corresponding 32 bit communication words selected by those labels when they appear on the LRU bus network. The label or labels of the communication words received by data collection circuitry 77 under the control of microprocessor 71 are repetitively compared with the corresponding label of the 32 bit communication word received from the bus network at inputs 24, 26; the reference label entered at thumbwheel switches 34a-34c of control panel 22. When a match is detected between the selected label and a label of a received communication word at input ports 24, 26, data collection circuitry 77 generates an interrupt signal to microcomputer 71 causing microcomputer 71 to call up an interrupt routine which retrieves the complete communication word from data collection circuitry 77 and then processes the word for display at LCD window 46 of control panel 22 or for use by other associated circuitry. In order to define the received communication word in proper engineering notation, data identified by the particular source equipment code transmitting the communication word is input to data collection circuitry 77 through switches 38a, 38b at control panel 22. The combination of label and source equipment code data accesses a cascaded series of preprogrammed read only memories ("ROMs") to generate data defining the proper engineering notation for the selected 32 bit word; the engineering notation data retrieved as part of a specific addressed interrupt service routine.

Figure 5A:
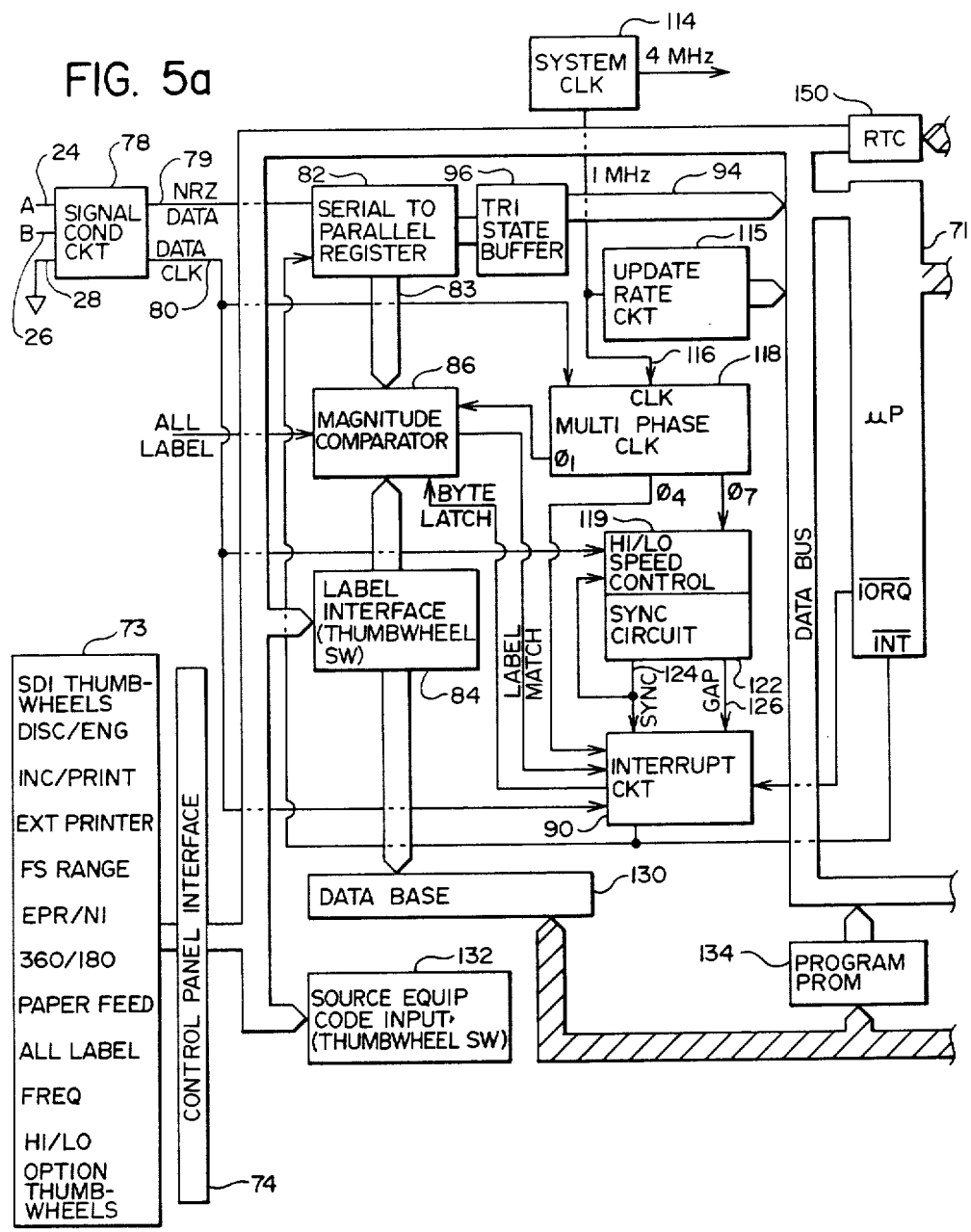
FIGS. 5a and 5b are a block diagram illustrating the test set circuitry in greater detail.
Figure 5B:
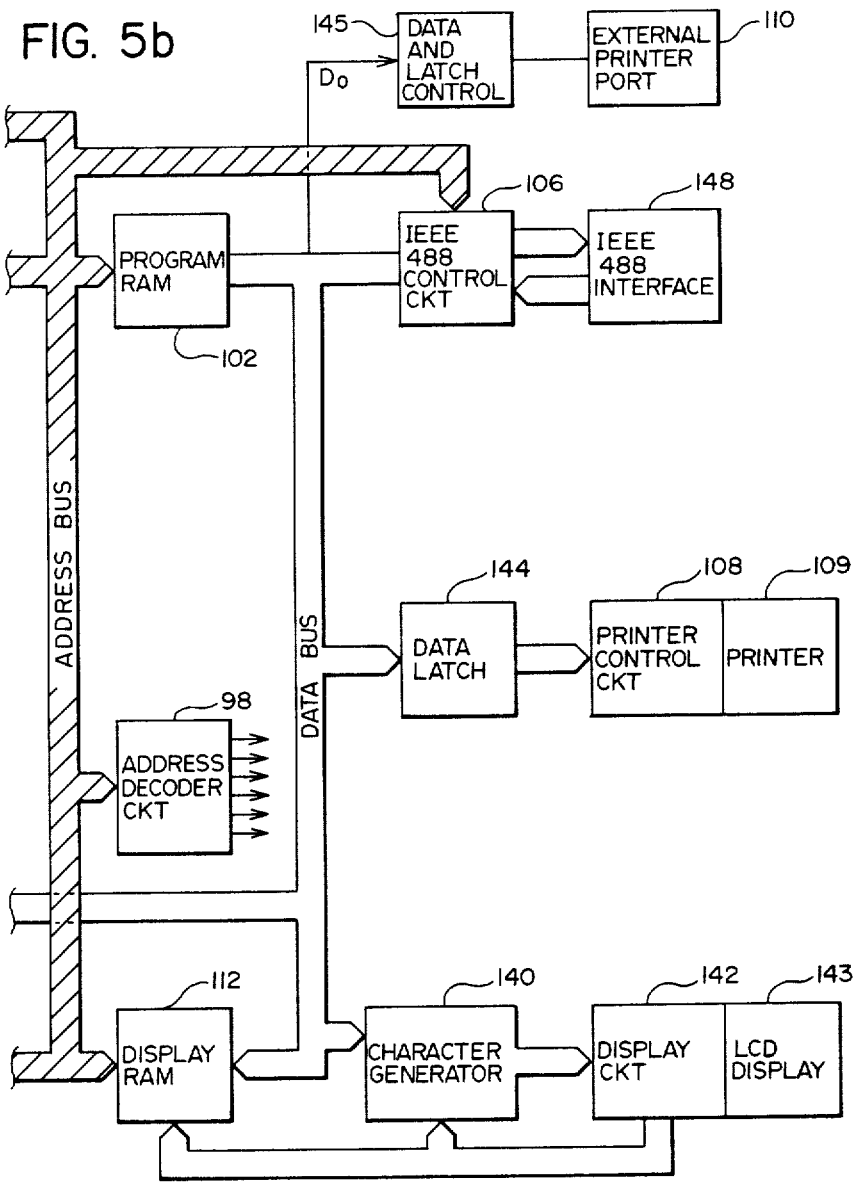

Referring now to FIG. 5 there is shown a more detailed diagram of the circuitry of the present invention in block form, wherein a bipolar plus or minus 5 volt serial digital signal enters ports 24, 26 to signal conditioning circuitry at 78 which converts the input pulses into two serial outputs comprising a data output hereinafter referred to as a non return to zero signal (NRZ) output at 79, and a data clock at 80 for clocking the NRZ data through the downstream circuitry. The serial NRZ data is converted to 8 bit parallel form at serial to parallel register 82 where it is compared at label magnitude comparators 86 either to the label code entered via label code input 84 defined by thumbwheel switches 34a-34c or to the label code entered by means of IEEE-488 control circuit 106 activating interrupt circuitry 90 when the incoming NRZ data word is identical to the label. The interrupt circuitry 90, to be described in further detail hereinafter, provides interrupt signals to microcomputer 71, each interrupt occurring when 8 bits of the selected 32 bit word are available for retrieval at data output 94 of tristate buffer 96. These interrupt signals are also transmitted to serial to parallel register 82 in order to latch the 8 bits of the 32 bit ARINC word at output 83 thereof. Tristate buffer 96 is enabled by microcomputer 71 via address decoder circuitry 98; the selected data is stored at program RAM 102 for later retrieval by IEEE-488 controller 106, internal printer controller 108, external printer 110, or storage at display RAM 112.

Overall system clocking is provided by system clock 114 outputting 4 MHz clocking pulses to various system components such as microcomputer 71; the 4 MHz signal is divided down to 1 MHZ in order to clock data from data clock output 80 into input port 116 of multiphase clock circuit 118. The 1 MHz output is also used to clock update rate circuitry 115 which is used to determine the update rate in milliseconds between successive selected labels. Multiphase clock 118 provides timing pulses which are delayed from the data clock by 0.1 microseconds at a phase 1 output in order to clock magnitude comparator 86, phase 4 output to clock a portion of interrupt circuitry 90, and a phase 7 output to clock a portion of high/low speed control circuitry 119.

In order to provide pulses synchronized to the retrieval of the 32 bit communication word, SYNC circuit 122 under the control of high/low speed control circuit 119 provides both a SYNC output at 124 and a gap (SYNC NOT) output at 126; the gap pulse active for the time period between incoming 32 bit communication words. SYNC circuit 122 includes resistor-capacitor (RC) circuitry for detecting the beginning and end of an ARINC word. In order to provide the proper SYNC pulse when the incoming NRZ data is either at a high speed 100 KHz rate or low speed 12.5 KHz rate, the high/low speed control circuit 119 automatically changes the length of the RC time constant at SYNC circuitry 122 in a manner to be described later.

In order to define the selected 32 bit ARINC word in proper engineering units and units of measure, as well as to determine whether the ARINC word is in binary coded decimal (BCD), binary or discrete format, determine decimal point location, and decode the sign status matrix (SSM), information from data base 130 is provided which is retrieved for storage and manipulated together with the selected ARINC data at program RAM 102. The information obtained from data base 130 is accessed via label code input 84 entered by means of thumbwheel switches 34a-34c, and source equipment code input 132 entered by means of thumbwheel switches 38a, 34b.

Overall control of test set 20 operation is accomplished by microcomputer 71 (FIG. 4 and 5) comprising an 8 bit microprocessor such as the Z80A microprocessor manufactured by ZILOG Inc., Campbell, CA, along with a machine code program PROM 134, program RAM 102 and address decoders 98 (FIG. 5). Program PROM 134 comprising a machine code programmable read only memory generates in conjunction with microcomputer 71 and address decoders 98, read, write and enable signals to retrieve the selected communication and data defining the selected communication word from serial to parallel register 82 and data base 130 respectively via the appropriate interrupt service routine, for temporary storage in program RAM 102; the data remaining in RAM 102 until retrieved for storage in LCD display RAM 112 or other circuitry described previously.

Actuation of operator control switches at control panel 22 through control panel interface 74 addresses specific subroutines stored in program PROM 134 which contain the instructions for carrying out the particular desired operation, such as for example, initiating paper feed at slot 56 of control panel 22.

In order to provide a visual presentation at window 46 (FIG. 3), data encoded in the selected communication word entering test set 20, from IEEE-488 circuitry or from the system bus network, as well as data defining the correct engineering units/units of measure accessed from data base 130, is stored temporarily in program RAM 102 and then converted therein to ASCII characters which are then used to generate font information via character generator PROM 140. New data is written into display RAM 112 after each new selected communication word is retrieved and formatted by the downstream circuitry. Random display errors at window 46 are prevented by relatching the last LCD address at RAM 112 after each new byte is written to the display from the data bus by microcomputer 71. Retrieval of data information for visual display at window 46 is accomplished in a manner well known to those skilled in the art utilizing display control circuitry 142 and microprocessor based display circuitry 143.

In order to place the selected data in permanent form, internal printer controller 108 is actuated by switch 57 (FIG. 3) at control panel 22 to print out hard copies of the data in engineering units or binary form. There is also provided an external printer port 110 (FIG. 5) which provides data from program RAM 102 in serial form via the data bus for RS 232 transmission under the control of a data latch 145 and associated circuitry. Formatting of the serial data by system software as well as the transfer of the data to printer 109, external printer port 110 under the guidance of printer control circuit 108 and data latches 144, 145 is understood by those skilled in the art and will not be discussed further herein.

Additionally, to provide interface with IEEE-488 equipment, IEEE-488 interface 148 transceives the data in parallel to and from program RAM 102 under the control of IEEE-488 control circuitry 106 in a well known manner. Operator controls 73 at control panel interface 74 may be deactivated by IEEE-488 signals so that IEEE-488 program data may be entered at IEEE interface 488 in lieu of operator control inputs at control panel interface 74.

Real time information is provided by real time clock 150; the data comprising the real time information may be displayed at window 46 or printed out at printers 109, 110.

SIGNAL CONDITIONING CIRCUITRY

Figure 6:
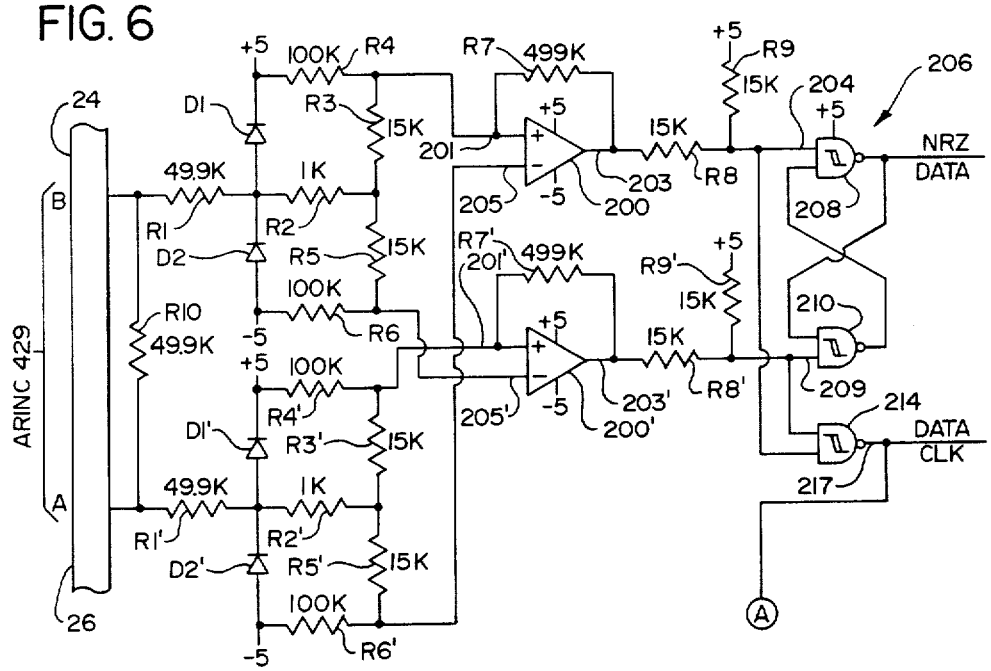
FIG. 6 is a schematic diagram of signal input conditioning circuitry.

Reference is now made to FIG. 6 where there is shown a schematic of the signal conditioning circuitry 78 utilized for converting bipolar signals input through ports 24, 26 to separate outputs including an NRZ data output, and a multiphase data clock output used to clock the data through the downstream digital circuitry.

Specifically, the bipolar signals enter input port 24 and then are processed by a current limiting resistor R1, voltage limiting resistor R2, and input protection circuitry at the connecting points of R1 and R2 comprising input protection diodes D1, D2 connected to +5 volt and −5 volt supplies respectively, the input protection circuitry utilized to limit the input signal to a maximum of ±5 volts in the downstream circuitry. Although limiting the input signals to ±5 volts may result in some loss of noise immunity, this allows the system to operate on low voltage battery power. Resistor R2 is connected to two voltage dividers for scaling the input voltages to a predetermined ratio, including a first voltage divider comprising resistors R3 and R4 connected in series to a +5 volt supply, the ratio of R4 to R3 approximately 6.5 to 1; and a second voltage divider including resistors R5 and R6 connected in series to a −5 volt supply, the ratio of R6 to R5 approximately 6.5 to 1. The connecting point of R4 and R3 is connected to the positive input 201 of a voltage comparator 200, such as for example, an LM 139 manufactured by National Semiconductor, Corp., Santa Clara, Calif, having an output voltage swing between +5 volts and −5 volts. Comparator 200 also includes a feedback resistor R7 connected between a positive input 201 and output 203 of comparator 200 to provide input hysteresis voltage. The connecting point of R5 and R6 is connected to the negative input 205' of a comparator 200'; comparator 200' being identical to comparator 200 and including a feed back resistor R7' connected between a positive input 201' and output 203' of comparator 200'. The output of comparator 200 includes a resistor R8 connected to the +5 volt supply through pull up resistor R9 to convert the ±5 volt output from comparator 200 to approximately +5 volts and zero volts.

A bipolar signal entering input port 26 180° out of phase to the signal entering port 24, encounters circuitry identical to that at port 24, and identified in FIG. 6 by a prime symbol, including input resistors R1' and R2', input protection diodes D1', D2' a first voltage divider comprising resistors R3' and R4', R3' and R4' having values in a ratio of 6.5 to 1 respectively, the connecting point of R3' and R4' connected to positive input 201' of comparator 200'; a second voltage divider comprising resistors R5' and R6' having values in the ratio of 1 to 6.5 respectively, the connecting point of R5' and R6' connected to a negative input 205 of comparator 200. Also included is a comparator 200' having a voltage swing of ±5 volts, resistor R8', and pull up resistor R9' connected to the +5 volt supply. In the event either inputs 24, 26 become open or grounded, a cross-over resistor R10 connecting ports 24 and 26 upstream of resistors R1 and R1' respectively is used for the purpose of biasing comparators 200 and 200' to prevent generation of the data clock. Utilizing representative component values depicted in FIG. 6, the voltage values between inputs 24 and 26 under the ARINC specification are from about ±6.5 volts to about ±13 volts with a null value between ±2.5 volts.

The output of comparator 200 downstream of resistor R8 is connected to the set input 204 of a Schmitt flip flop, indicated at 206, comprising cross-coupled NAND gates 208, 210 for converting the output from comparators 200, 200' to a single NRZ data output; the output of NAND gate 206 providing the NRZ data feed for the downstream digital circuitry. The output of comparator 200' downstream of resistor R8' connects to a reset input 209 of Schmitt flip flop 206. Resistors R8 and R8' are connected to the respective inputs of a Schmitt NAND gate 214, the output 217 of NAND gate 214 comprising the data clocking pulse for the downstream circuitry.

It should be appreciated therefore, that the signal conditioning circuitry of the present invention is not limited to conditioning ARINC data, rather it may be used with other circuitry when it is desirable to rectify a bipolar input with high noise immunity using a small number of components.

AUTOMATIC HIGH/LOW SPEED CONTROL

Figure 7:
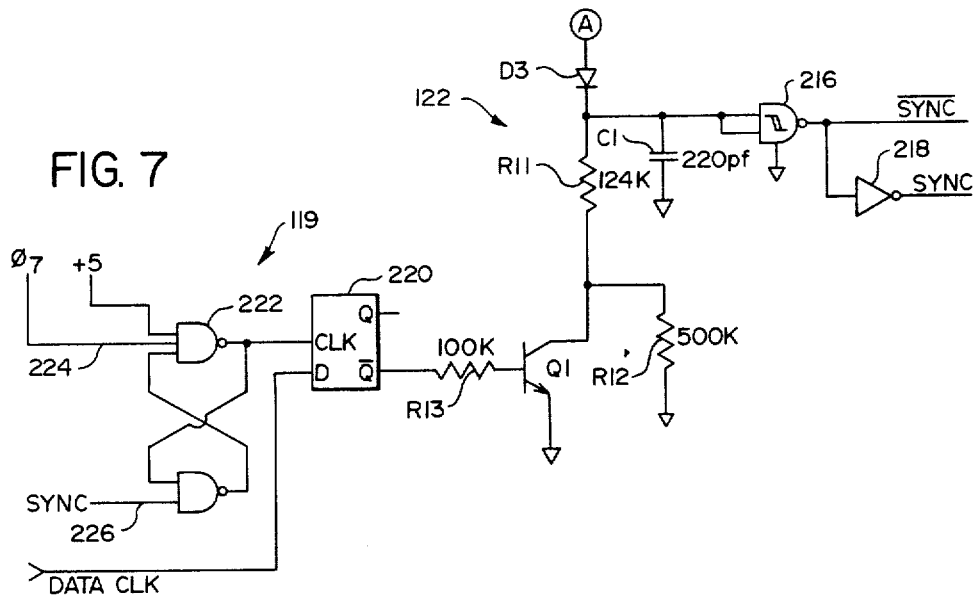
FIG. 7 is a schematic diagram of data frequency detection circuitry and automatic SYNC pulse control circuitry.

In order to provide a synchronizing pulse for downstream circuitry which is active during the receipt of each 32 bit communication word at ports 24, 26, the present invention incorporates SYNC circuitry 122, best shown in FIG. 7, for generating a SYNC pulse which is normally low within 1.5 clock periods after the end of the communication word as detected by the RC circuitry. To this end, the data clock output 217 from NAND gate 214 (FIG. 6) is routed via blocking diode D3 (FIG. 7) to a voltage divider network including series resistors R11, R12. In order to form an RC timing circuit, a capacitor C1 is coupled to the juncture between diode D3 and resistor R11, thus defining an RC timing circuit including either: (i) resistor R11 by itself; or (ii), both series resistors R11, R12. The input to capacitor C1 is coupled to both inputs of a Schmitt NAND gate 216, the output of which comprises the SYNC NOT (gap) signal which, when passed through inverter 218, provides SYNC and SYNC NOT signals used in further downstream circuitry hereinafter described. To reduce the RC time constant utilized in the SYNC circuitry 122, a transistor Q1 is provided having its collector coupled to the juncture between series resistors R11, R12, so as to insure that when transistor 01 is in the "on" state, resistor R12 is bypassed, thus reducing the RC time constant.

The bipolar signals to inputs 24 and 26 comprise one of two frequencies in accordance with the ARINC specification--viz., a high speed signal (100 KHz) having a pulse width of 10 microseconds, and a low speed signal (12.5 KHz) having a pulse width of 80 microseconds. Transistor Q1 is connected to high/low speed detection circuitry 119 in a manner such that when Q1 is turned "on" by the speed control circuitry 118, resistor R12 is bypassed through the emitter of Q1 to ground, thus decreasing the RC time constant formed by resistors R11, R12 and capacitor C1. It should be appreciated that the RC time constant circuitry is used to detect the absence of any active bits within 1.5 clockings of bit 32 of the ARINC word, thereby signifying the end of that word. Therefore the circuitry is designed so that capacitor C1 will discharge to a sufficiently low level in the absence of a charging voltage to provide an active low input to NAND gate 216, the output of which provides an active high SYNC NOT signal. Since the timing between sequential ARINC words will vary depending on whether being transmitted at high speed or low speed, the RC time constant must change to reflect these varying gap periods. When high speed signals are detected, thus turning transistor Q1 "on", resistor R12 is bypassed, decreasing the RC time constant so that NAND gate 216 switches at a higher rate to generate the high speed SYNC signal. When low speed input signals are detected by the speed control circuitry 118, transistor Q1 is turned "off" so that resistors R11, R12 and C1 form a longer predetermined RC time constant to switch NAND gate 216 at a much slower rate providing SYNC and SYNC NOT pulses matching this slower signal rate.

Still with reference to FIG. 7, control of transistor Q1 is provided by a D-type flip flop 220 connected through a current limiting resistor R13 to the base of transistor Q1. Data to flip flop 220 is provided from the data clock output of NAND gate 214 (FIG. 6); while flip flop 220 is clocked by an upstream RS flip flop 222. In order to clock flip flop 222 seven microseconds after the arrival of ARINC word data at ports 24, 26 (FIG. 3), the phase 7 output from multiphase clock circuit 118 (FG. 5) is provided at a "set" input 224 of flip flop 222. Data from the data clock line enters flip flop 220 at the D input, the last half of the data clock cycle having a pulse width of either 5 microseconds or 40 microseconds depending on the ARINC transmission rate. However, "set" input 224 of flip flop 222 is clocked 7 microseconds after arrival of an ARINC word at ports 24, 26 so that when a high speed pulse having a pulse width of 5 microseconds is input to flip flop 222, it is clocked out therefrom to turn transistor Q1 "on" and bypass resistor R12 producing a shorter RC time constant; whereas a slow speed data clock pulse of approximately 40 seconds is clocked at the 7 microsecond interval into flip flop 220 to turn transistor Q1 "off", thereby no longer bypassing R12 and increasing the RC time constant. To reset flip flop 220 via flip flop 222 at the end of an ARINC word, a changing SYNC signal from inverter 218 is input to the "reset" terminal 226 of flip flop 222, thus allowing the latter to clock D flip flop 220 only once for each ARINC word. Under ARINC specification 429-7, the SYNC pulse must switch within 1.5 clockings of the last 32 bit ARINC word. An RC time constant defined by resistor-capacitor values of 220 picofarad/122K ohms for high speed transmission rates and 220 picofarads/624K ohms for low speed transmission rates fulfills this requirement.

UPDATE RATE CIRCUITRY

Figure 8:
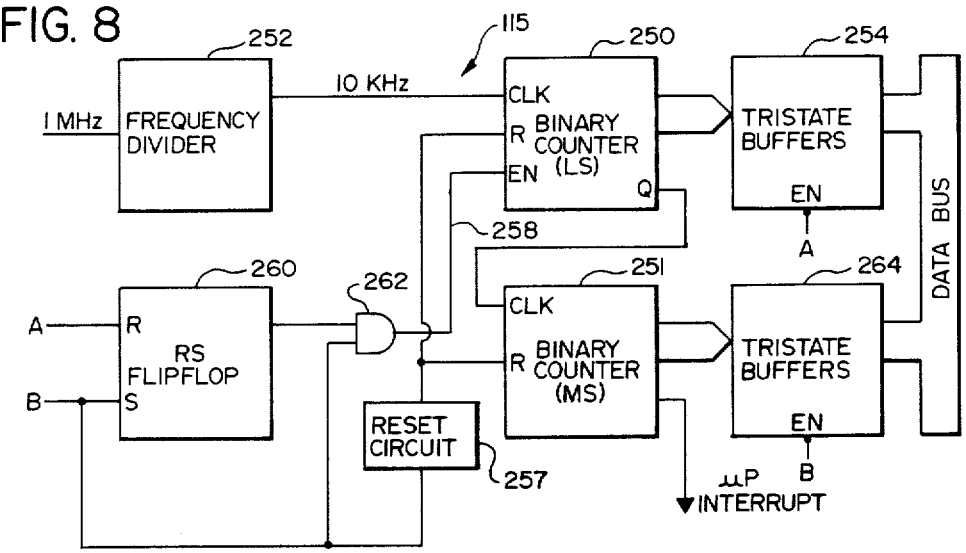
FIG. 8 is a block diagram of the update rate circuitry.

In order to provide the update rate in milliseconds between successive selected labels at window 46 (FIG. 3) of test set 20, there is shown in FIG. 8, update rate circuitry 115 comprising a binary counter 250 for counting the least significant byte of the update rate, and binary counter 251 for counting the most significant byte of the update rate. Counter 250 is clocked by a 10 KHz signal obtained via frequency divider 252 from a 1 MHz pulse generated by system clock 114 (FIG. 5) Each count of counters 250, 251 comprises 0.1 milliseconds. Upon retrieving a selected label, microprocessor 71 (FIGS. 4 and 5) enables tristate buffer 254 to read data from binary counter 250. Binary counter 250 is then disabled at input 258 via RS flip flop 260 and AND gate 262 thereby terminating any further counting.

In order to read the data comprising the most significant byte at binary counter 251, microprocessor 71 (FIGS. 4 and 5) enables a second tristate buffer 264 to place the binary count out on the data for later processing, after which it resets and enables binary counters 250, 251 to begin timing the interval until retrieval of the next selected label. The reset pulse from microcomputer 71 is input to reset circuitry 257 comprising an RC timing circuit wherein a reset pulse is produced to reset binary counters 250, 251. If the selected label code is not received within 1.6 seconds to reset binary counter 251, binary counter 251 generates an interrupt signal to microprocessor 71 (FIGS. 4 and 5) to call up an interrupt service routine which causes window 46 (FIG. 3) to display "No selected label or slow update rate" if selected label data is not present on the data bus and other label information is present, or "Inactive bus" if no data is present on the data bus as determined by an input port from SYNC circuit 122 (FIG. 7).

INTERRUPT CIRCUITRY

Figure 9:
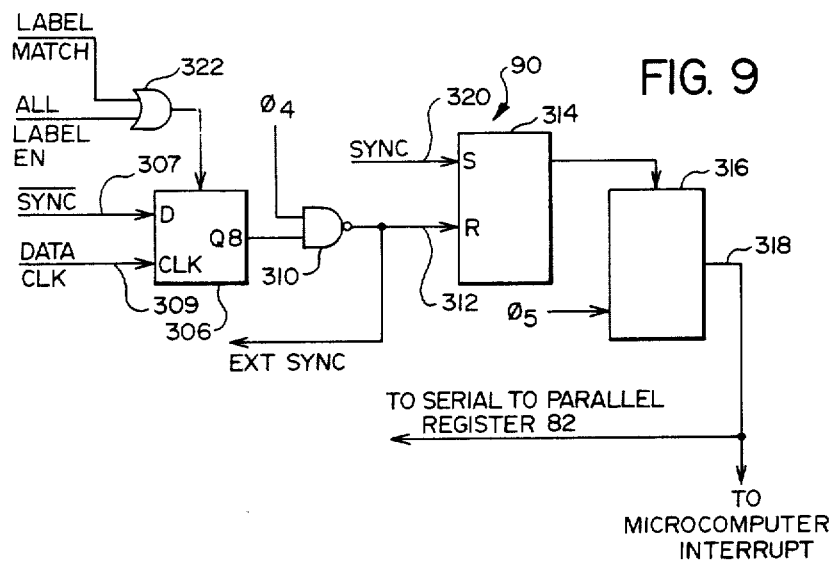
FIG. 9 is a schematic diagram of the microcomputer interrupt circuitry.

As discussed previously, repetitive comparisons are made between the selected label entered at thumbwheel switches 34a–34c and the label containing bits 1 through 8 of each communication word entering test set ports 24, 26. When a match is found between a selected label and the label encoded in bits 1 through 8, a label match signal is transmitted to interrupt circuitry 90, illustrated in FIG. 9, thus enabling a shift register 306 clocked by a data clock signal from a NAND gate 214 (FIG. 6) to input 209. In order to prevent false triggering from a label match produced by 8 bits of incoming data which may not comprise the ARINC label, a SYNC NOT signal is clocked into shift register 306 at input 307, outputting from shift register 306 at the eighth clocking thereof a signal gated by the phase 4 clock from multiphase clock circuit 118 (FIG. 5) through a NAND gate 310 to provide a signal at the eighth bit of each selected ARINC word to reset input 312 of an RS flip flop 314. RS flip flop 314 then enables an 8 bit ring counter 316 to interrupt microcomputer 71 (FIGS. 4 and 5) four times, each interrupt calling up an interrupt service routine stored in program PROM 134 (FIG. 5) to retrieve the 32 bit ARINC word, 8 bits at a time. Ring counter 316 is clocked by phase 5 clock signal derived from multiphase clocking circuit 118 to allow sufficient time for any propagation delay in the interrupt circuitry 90. In addition to providing interrupt signals to microcomputer 71, output 318 of ring counter 316 strobes a new set of data onto the output from serial to parallel register 82 (FIG. 5) for retrieval by microcomputer 71. After the 32 bit ARINC word has been processed by the signal conditioning circuitry, the changing SYNC output resets RS flip flop 314 at input 320 to disable ring counter 316 in preparation for receipt of the next ARINC word. In addition, the gated output from NAND gate 310 is used to provide an external signal through output port 32 of test set control panel 22 (FIG. 3) synchronized to each selected ARINC word.

In order to retrieve every label which enters test set ports 24, 26, activation of all label switch 68 (FIG. 3) produces an all label enable signal at OR rate 322 to continuously enable shift register 306. After selection of an all label mode by switch 68 or via IEEE-488 circuitry, microcomputer 71 is continuously interrupted to retrieve each ARINC word as it is received at test set 20 for subsequent display of the label portion of the ARINC word at test set window 46 or print out at printers 109, 110, or return through IEEE-488 interface 140.

DATA BASE

As discussed previously, 8 bits of label code together with 8 bits of source equipment code are used to address an internal data base which outputs 8 bytes of defining data illustrated in FIG. 10. The 8 bytes of defining data are retrieved by microcomputer 71 (FIGS. 4 and 5) from the data base for storage in program RAM 102 (FIG. 5) where they are manipulated together with the 32 bit ARINC word stored therein to define the ARINC word in engineering notation, the term "engineering notation" is defined to include engineering units, units of measure, polarity or direction, and decimal point location. byte 3 determines whether the incoming data is is BCD, binary or discrete format, discrete format meaning that each bit of data therein may represent a specific piece of information distinct from other bits. The conversion of an ARINC word to engineering notation requires, for proper decoding, the determination whether the inter-LRU data is encoded in BCD, binary or discrete format; the particular format being a function of the assigned label and source equipment code listed in the ARINC 429 specification. For example, sign status matrix (SSM) bits 30 and 31 (FIG. 1) when occupied by data encoded in BCD, contain matrix data representing source transmitter status or data sign. The sign of the data encoded in combinations of 1's and 0's can mean plus/minus, north/south, east/west, right/left, to/from, or above/below as defined by SSM bits 4 though 6, byte 1 of the engineering notation defining data shown in FIG. IO. Status conditions, also represented by combinations of 1's and 0's can mean failure warning, normal, no computed data, or functional test. However, when the received data is encoded in binary, sign conditions are encoded at bit 29, whereas SSM bits 30 and 31 contain status conditions as described previously in reference to BCD encoded ARINC words.

Determination of the format of the ARINC word is also important for converting the ARINC word into engineering notation. Bytes 4 through 6 of the engineering notation defining data contain most significant bit value of the engineering units when the incoming ARINC word is formatted in binary, whereas bytes 4 through 6 represent the number of bits per BCD digit when the incoming ARINC word is formatted in BCD. In addition byte 2 assists in scaling the data by indicating the number of significant digits (BCD), or number of significant bits defining the full scale range (binary). For example, if the ARINC word is formatted in binary, then the value of the data field is determined by assigning one half of the full scale range to the most significant bit weight of the ARINC word data field—in this case, bit 28. Software checks are then made to determine whether bit 28 of the data field contains a 1 or 0; if a 1 is found then one-half of the full scale range is stored in program RAM 102. The bit weight of bit 28 is then reduced by one-half and assigned to bit 27, bit 27 is checked for a 1 or 0 and if a 1 is found, then one-quarter of the full scale value is added to the previous value already stored in program RAM 102. The software checks are continued until all bits of the data field have been checked.

On the other hand, if the ARINC word is formatted in BCD, then the value of the data field in engineering units is determined by bytes 4 through 6 disclosing the number of bits per BCD digit together with byte 2 disclosing the number of significant digits defining the data field, and converting each BCD digit to ASCII beginning with the highest order BCD bits and working down to the lowest order BCD bits.

Determination of the units of measure assigned to the data field utilizes byte 8 of the engineering notation defining data to address a software look-up table containing ASCII units of measure for that particular encoded byte.

In order to address the 256 possible combinations of label code and 256 possible combinations of source equipment code, there is shown in FIG. 11 a data base, indicated at 340, comprising a plurality of cascaded programmable read only memory devices 342, 344, and 346. PROMs 342, 344, 346 are configured such that label code and source equipment codes obtained from the ARINC specification corresponding to designated operating parameters are input via control panel interface 74 to programmable memory (PROM) 342, and output at PROM 346 in the form of data bytes defining the corresponding engineering notation for the source equipment/label code input. Interface 74 includes thumbwheel switches 34a-34c (FIG. 3) for the input of label code in octal and conversion to binary, and thumbwheel switches 38a, 38b (FIG. 3) for the input of source equipment code in hexadecimal and conversion to binary. The 8 bits of label code together with the 8 bits of the source equipment code provide 65,536 (64K) possible input combinations at PROM 342, of which approximately 550 combinations are presently used in the exemplary form of the invention. However, the cascaded configuration of PROMs 342, 344 and 346 provide for 256 outputs parameter format bytes. Under the latest ARINC specification 429-7 there are only 138 possible parameter formats associated with any label and source equipment code combination; and, consequently, the cascaded PROM configuration allows for future expansion in the event additional parameter formats are specified which would require the addition of new parameter formats not all ready contained in the data base.

To define the selected ARINC word in proper engineering units, it is necessary to know the full scale range of the particular operating parameter as well as the number of data bits necessary to define that full scale range. For example, in the ARINC specification, label 215/source equipment code 06 normally encoded as impact pressure may have values from 0 to 511.97 millibars—i.e., a full scale range of 511.97. In order to describe that full scale range of values with sufficient accuracy, 14 significant bits are required under the ARINC specification to compute the values over the full scale range.

Referring now to FIG. 2 there is shown a portion of the ARINC specification including label codes, source equipment codes and operating parameters. Label code 011 references only the operating parameter "Present Position—Longitude". Likewise, label code 042 references the operating parameter "Set Longitude" which uses an identical full scale range and identical number of bits to define the engineering units corresponding thereto. In addition, parameters "Present Position—Longitude" and "Set Longitude" use identical full scale ranges and identical numbers of bits to define their operating parameters in engineering units although they are associated with different label codes. The cascaded PROM data base takes advantage of this matching of a single full scale range/number of bit parameter format to a plurality of label/source equipment code combinations to define each selected ARINC word in proper engineering notation. However under the ARINC specification, one label such as label 034 (FIG. 2), may be assigned to different operating parameters, requiring the use of a source equipment code to distinguish between different parameters having identical labels.

Presently under ARINC specification 429-7 all possible combinations of label and source equipment codes can be described in engineering notation defined by 138 different parameter formats. The present invention accomplishes this in a manner best illustrated in FIG. 11 wherein PROMS 342, 344, and 346 are enabled at inputs 343, 345, 347 respectively by microprocessor 71 via address decoders 98 (FIG. 5). Label code and the higher order 4 bits, hereinafter referred to as the most significant nibble (MSN), of the source equipment code are entered into address inputs 348 of PROM 342. The data accessed from PROM 342 by the label/MSN address, together with the remaining lower order 4 bits, hereinafter referred to as the least significant nibble (LSN), of source equipment code are entered into address inputs 350 of PROM 344. The data accessed from data outputs 352 of PROM 344 by the label/LSN address is entered into address inputs 354 of EPROM 346 together with a 4 bit input from microcomputer 71 (FIG. 5) comprising the least significant bits of the address, to read the 8 bytes of engineering notation defining data from PROM 346; the output of PROM 346 at 349 representing the data necessary to define the operating parameter associated with the source equipment code and label entered at control panel interface 74.

Delay circuitry shown at 70 comprises an RC time constant to provide a "wait" input to microprocessor 71 allowing the data sufficient time to propagate through PROMS 342, 344 and 346 before retrieval by microprocessor 71 for subsequent storage at program RAM 102.

PROGRAMMING THE DATA BASE

Figure 12:
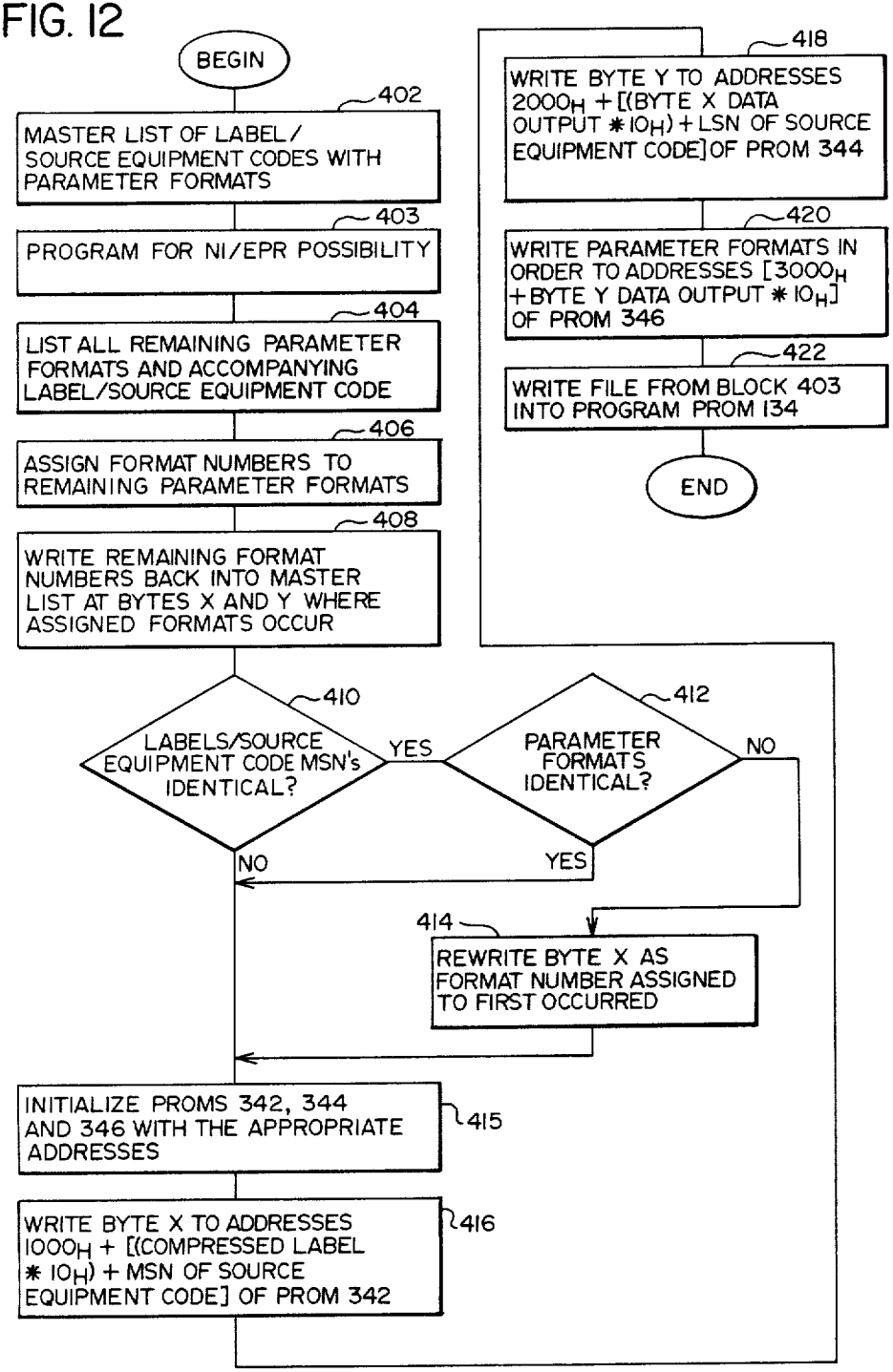
FIG. 12 illustrate a flow chart for programming the data base shown in FIG. 11.

Broadly, data base 340 comprising programmable memory devices 344, 344 and 346 is programmed in accordance with the flow chart illustrated in FIG. 12 such that PROMS 342 and 344 reduce the possible 65,536 combinations of label code and source equipment code to 138 format numbers which, in turn, access 138 parameter formats stored in PROM 346 defining all the operating parameters disclosed in the current ARINC 429-7 specification in engineering notation. It should be appreciated that while the following description discloses a method for programming data base 340 to output defining data appropriate to the ARINC specification only, the cascaded PROM data base of the present invention is applicable to broader uses than merely defining data under the ARINC 429 specification.

A listing is made from the ARINC specification at block 402 of the data defining each of the 138 operating parameters, hereinafter referred to as parameter formats, comprising the 8 bytes of engineering notation defining data illustrated in FIG. 10 together with the label and source equipment code identifying that operating parameter. A program to handle any N1/EPR possibility is made at 403, the programming of which will be discussed in further detail hereinafter. A list of all possible parameter formats not previously flagged as N1 formats is made at 404 together with their accompanying label/source equipment codes. Format numbers are assigned to these parameter formats at 406, and the remaining format numbers are written back into the master list at bytes X and Y where matching formats occur. For example, referring to Table 1,

TABLE I

| Label Code | Source Equipment Code | Format Number Byte X | Byte Y | Parameter Format | | | | | | | |
|---|---|---|---|---|---|---|---|---|---|---|---|
| 042 | 02 | 05 | 05 | 33 | 06 | 11 | 14 | 44 | 44 | 02 | FF |
| | 04 | 05 | 05 | 33 | 06 | 11 | 14 | 44 | 44 | 02 | FF |
| 034 | 02 | 12 | 12 | 12 | 05 | 12 | 03 | 44 | 40 | 03 | FF |
| | 06 | 12 | 13 | 11 | 05 | 10 | 34 | 44 | 40 | 03 | FF |
| 011 | 02 | 05 | 05 | 33 | 06 | 11 | 14 | 44 | 44 | 02 | FF |
| | 04 | 05 | 05 | 33 | 06 | 11 | 14 | 44 | 44 | 02 | FF | label code 042 identifies the operating parameter "Set Longitude" regardless of whether the transmitting source is 02 or 04; and, therefore, both parameter formats are assigned the same format number 05 which is written back into the master list at 408 at bytes X and Y. The master list is then searched at 410 to determine whether any label/source equipment code most significant nibbles are identical. If not, PROMS 342, 344, and 346 are initialized with appropriate addresses at 415 (FIG. 12). In this case PROM 342 is assigned address 1000 through 1FFF, PROM 344 is assigned addresses 2000 through 2FFF, and PROM 346 is assigned addresses 3000 through 3FFF Byte X (format number 05) is then written into PROM 342 at those addresses comprising the PROM 342 initialization address i.e., 1000 hex, together with the label code input and most significant nibble of the source equipment code. For example, referring to FIG. 13, label code 042 equates to an address of 1220 in PROM 342 where format number 05 is stored.

Figure 13:
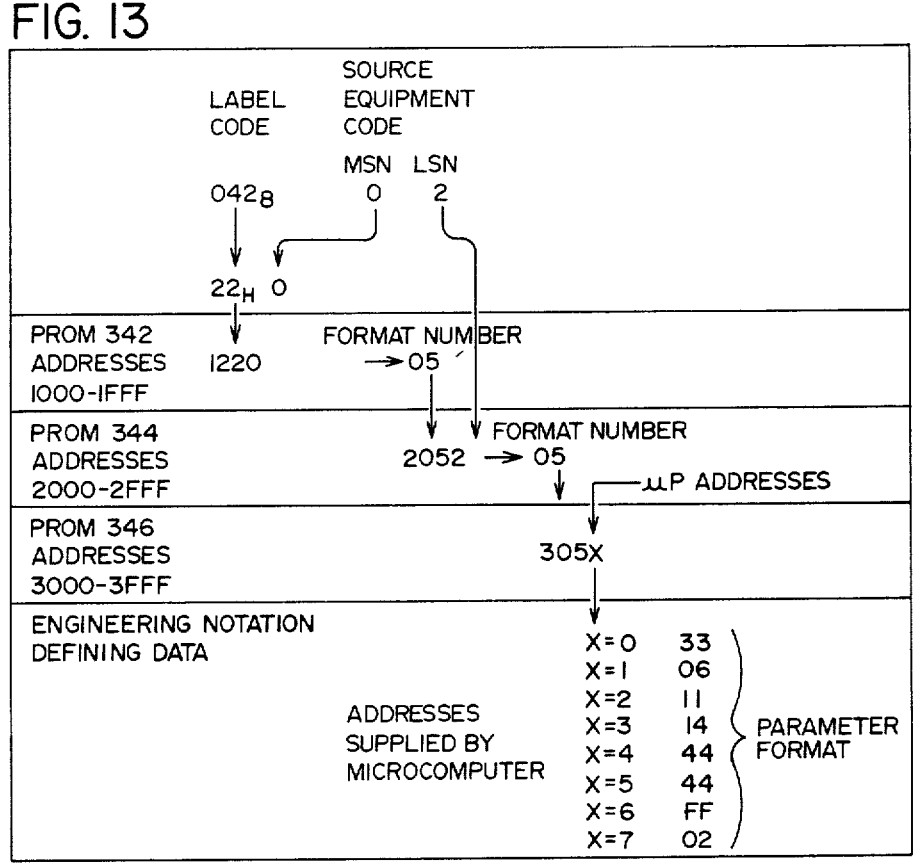
FIG. 13 is a diagram explaining operation of the data base.

Referring now to FIG. 12 in conjunction with FIG. 13 and Table 1, at 418 byte Y (format number 05) is written into PROM 344 at the address formed by the data output from PROM 342, which in this case is 05, and the least significant nibble of the source equipment code i.e., address 2052. At 420 the parameter format bytes are written in order into PROM 346 at those addresses formed by the data output from PROM 344, which in this case is 305X, i.e., addresses 3050 through 3057. The 8 bytes of parameter format are then accessed via the address bus in their proper order for retrieval to program RAM 102 (FIG. 5).

Figure 14:
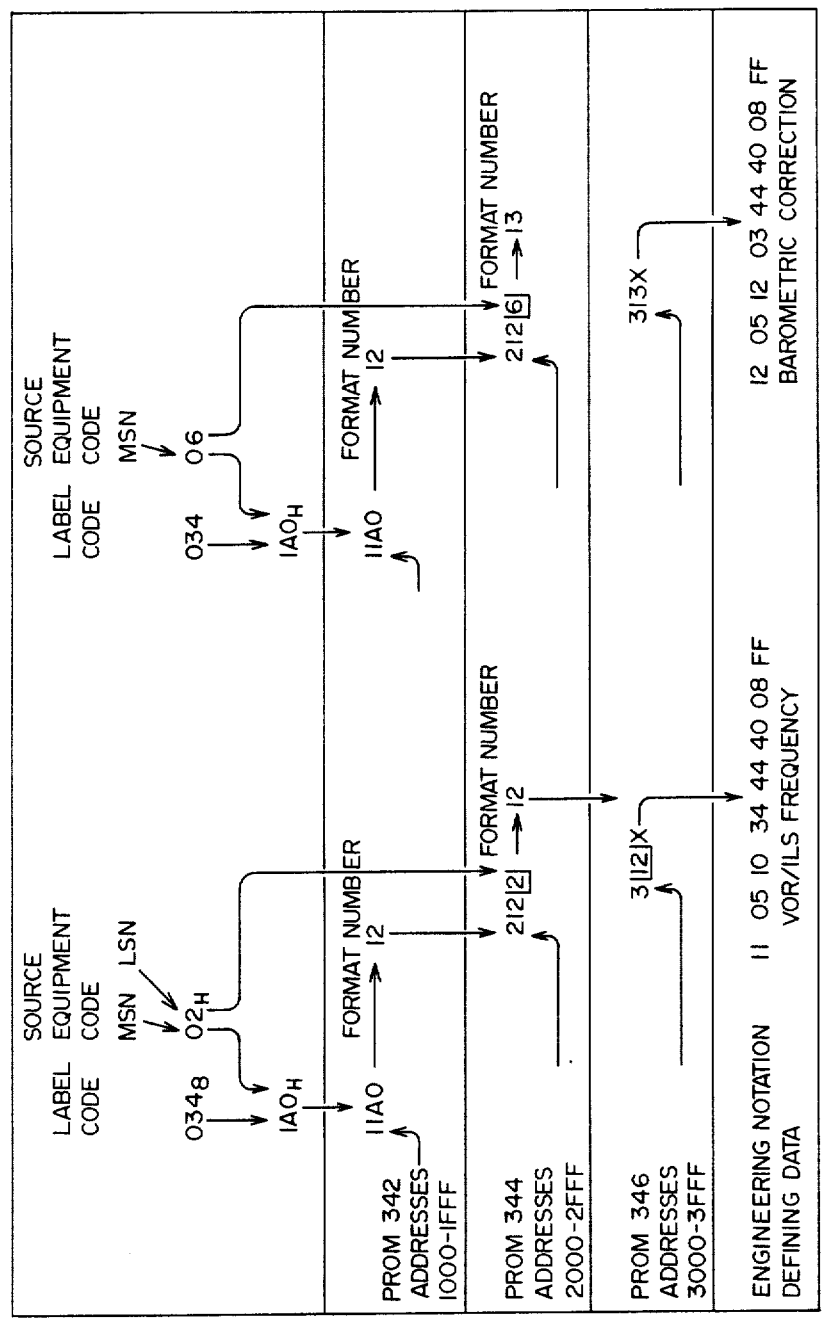
FIG. 14 is a diagram explaining operation of the data base comparing two separate label/source equipment code inputs having identical labels and identical source equipment code most significant nibbles.

Referring now to FIG. 12 in conjunction with FIG. 14, if when examining the master list at decision block 410 there are found label/source equipment codes with identical labels and identical source equipment code most significant nibbles, then PROM 342 must be specially programmed with addresses accessed by the least significant nibble of the source equipment code to reflect this difference. Therefore the sublist made up of identical labels/source equipment code most significant nibbles is further examined at decision block 412 to determine whether any of their parameter formats are identical. If so, the format number encoded in byte X of any later occurring parameter format is changed to the format number assigned to the first occurring format number of that label. For example, in Table 1, byte X of label code O34/source equipment code 06 is changed to the format number of the first occurring format number of that label i.e., format number 12. This change is required because in accordance with the design of data base 340, label/source equipment codes having identical labels and identical most significant nibbles of the source equipment code access the same location in PROM 342 (FIGS. 11 and 14). However, since label 034 is assigned to different parameter formats, separate locations in PROM 344 are used to store the respective format numbers. In certain instances the above described change results in a situation where byte X and the source equipment code least significant nibble as written in the master list will access one address location in 346, however wherein the parameter formats assigned to the respective label/source equipment codes are different. In this case an unused format number is assigned in the master list at byte X to the second occurrence of that identical byte X/source LSN combination so that different format numbers are accessed in PROM 344. The same unused format number must also be assigned to byte X of any label/source equipment code combination having a label/source MSN identical to the second occurring label/source MSN described above, in order to avoid programming two different format numbers at the same address in PROM 342.

As discussed previously there may be similar operating conditions which are measured under different parameters depending upon the aircraft manufacturer. Typically. one of the most frequently encountered of these conditions is an engine operational measurement identified either as engine pressure ratio (EPR) or percent rpm (N1). Since the measurements of EPR and N1 utilize different parameter formats to define engineering notation describing each, the operator is provided at control panel 22 with a switch 70 (FIG. 3) to select between EPR and N1 formats depending upon the parameter used by the manufacturer of the aircraft under test.

Figure 15:
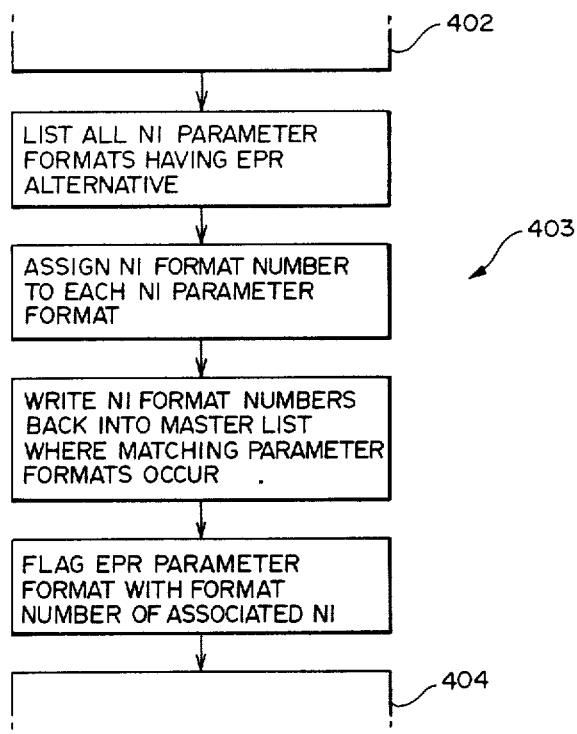
FIG. 15 is a flow chart illustrating the programming of the data base for N1 operation; and, FIG. 16 is a flow chart illustrating a main program controlling overall operation of the test set circuitry.

Referring now to FIG. 15 in conjunction with FIG. 10, parameter formats defining the engineering units for EPR together with the assigned N1 format numbers (N1 flags) are written into the master list in a manner similar to that previously described. However, only certain of the N1 parameters have an EPR alternative. Therefore, those parameter formats identifying an EPR parameter are flagged with the format number of the corresponding N1 parameter—viz., those N1 parameter formats having an EPR alternative identified by bit 7/byte 1 of the engineering notation defining data. When a particular label/source equipment code accessing an N1/EPR parameter is entered at control panel 22, the engineering notation defining the EPR parameter are retrieved from the data bus by microcomputer 71; (FIGS. 4 and 5). However when EPR/N1 switch 70 is in the N1 position, microcomputer 71 reads the N1 format number (Byte 7) included in the EPR parameter format causing retrieval of the N1 parameter format assigned to that N1 format number from a look-up table in program PROM 134.

The 180°/360° positions of switch 70 are programmed similarly to the N1/EPR positions discussed previously. The operating parameter defining the engineering notation for ±180° is entered into data base 340 including therewith a 360° flag assigned to the parameter format defining the engineering notation for ±180°. When toggle switch 70 is placed in the 360° position with a label/source equipment code accessing the ±180° operating parameter, microcomputer computer 71 reads the 360° flag to access (from a look-up table in program PROM 134) the engineering notation defining that parameter.

Option switches 40 are used to call up data from either program PROM 134 (FIG. 5) or from data base 340 (FIG. 11) in order to deal with built-in diagnostics, block captures, or to decode data which may not be defined by the ARINC specification. Option codes may address portions of program PROM 134 where specific program routines are stored, or address PROM 346 of data base 340 to access engineering notation defining data for non-ARINC operating parameters.

Figure 16:
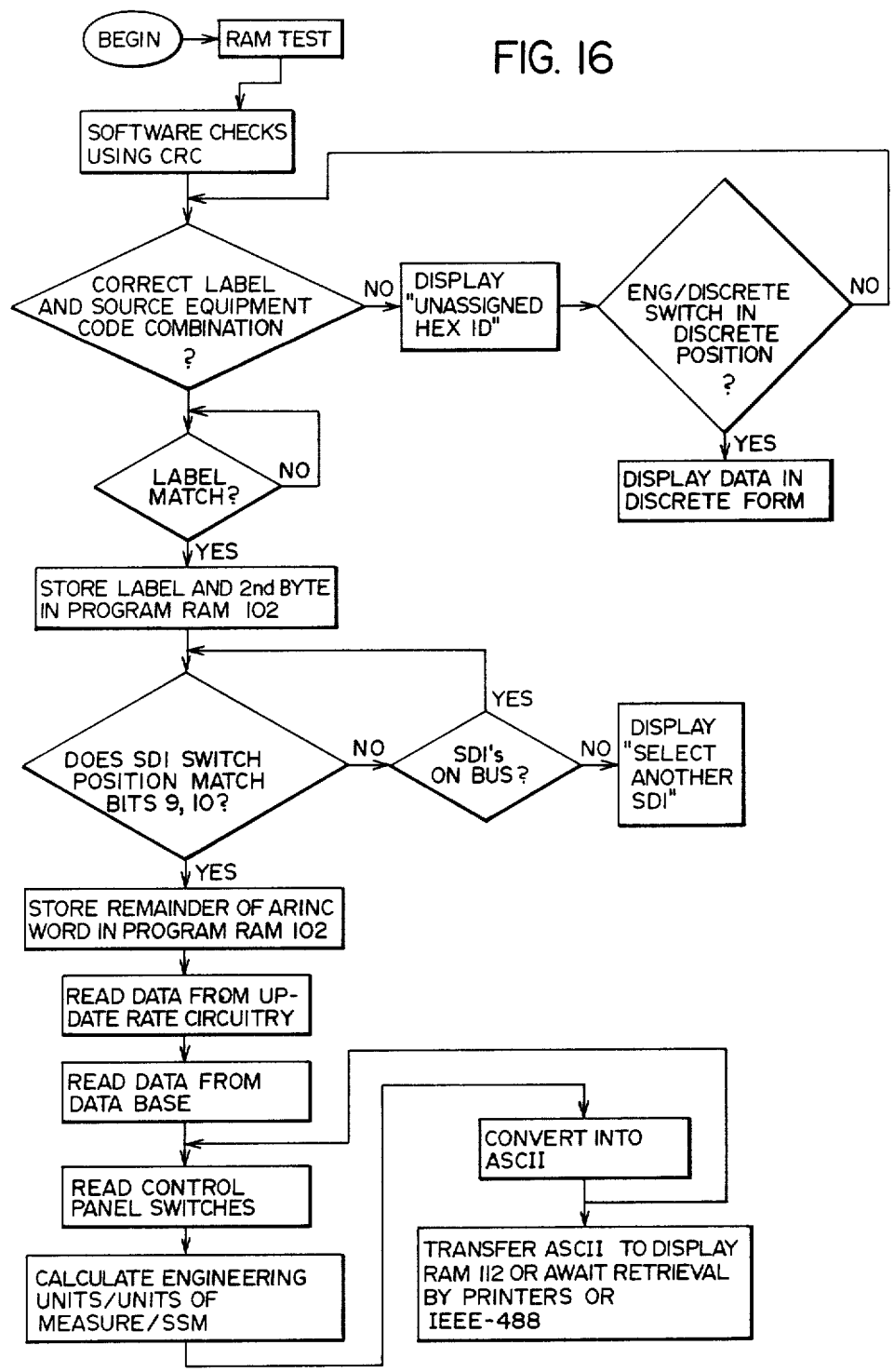

The reception, selection, decoding and displaying of inter-LRU communication words under the control of microcomputer 71, program PROM 134 and data base 130 is illustrated in FIG. 16. During power up, various software checks are made using cyclic redundancy code checking. The various switches at control panel 22 (FIG. 3) are read and a decision is made whether or not the label source equipment code combination entered at control panel 22 is valid by determining if any of the data bytes retrieved from PROM 346 are empty—i.e., contain FF instead of valid data. The presence of any empty data bytes causes test set window 46 to display "Unassigned hex ID" to remind the operator to recheck the label/source equipment code entered at control panel 22. Placing ENG/discrete switch 50 in the "discrete" position displays the incoming data as 1's and 0's, which then must be deciphered by the operator to interpret the data. As data enters test set 20, and a label match is found between the label code entered at control panel 22 and the label of the incoming ARINC word, the label as well as the second 8 bits of the ARINC word containing SDI bits 9 and 10 are retrieved by respective interrupt service routines. If bits 9 and 10 do not match, microcomputer computer 71 retrieves the selected communication word, however it is not processed in progam RAM 102. When SDI is possible, but an SDI has been selected which is not on the bus, then test set window 46 will display "Select Another SDI".

If SDI bits 9 and 10 match, the entire ARINC word is stored in program RAM 102. In addition the selected ARINC word update rate is read from binary counter output buffers 254, 264 (FIG. 8) and stored in program RAM 102 together with the engineering notation data retrieved from data base 340. The ARINC word together with the engineering notation data is manipulated in program RAM 102 and converted to ASCII where it is transferred to display RAM 112 for display at test set window 46 and then made available for retrieval by printers 109, 110.

While a particular embodiment of the apparatus and method of the present invention has been disclosed herein, it will be readily apparent to persons skilled in the art that numerous changes and modifications can be made without departing from the spirit and scope of the invention. For example, instead of employing the high/low automatic speed control circuitry to regulate the SYNC output, the RC time constant circuitry may be adjusted by hard wiring a switch at control panel 22 to bypass a portion of the resistor voltage divider therein in accordance with operator input. Other deletions and changes affecting portions of the test set circuitry are also envisioned without departing from the scope of the invention.

What is claimed is:

1. Apparatus for processing data which is in the form of communication words on a system bus, each communication word containing (i) an operating parameter field of digital data and (ii) an identifier field of digital data for identifying the operating parameter field, the apparatus comprising:

a. input means for entering a label field of digital data and providing a signal representative of the digital data at a first output;

b. input processing means in communication with the system bus and responsive to the first output for comparing the digital data of the label field with the digital data of the identifier field and for retrieving the communication word from the system bus when the identifier field corresponds to the label field, the input processing means further including signal processing means for processing the digital data of each communication word by converting first and second bipolar signals representing the digital data of the communication word into a unipolar digital signal representative of the communication word, the first and second bipolar signals being generally out of phase, the signal processing means including:
  (1) first means for receiving and scaling the first bipolar signal, the first scaling means having first and second outputs,
  (2) second means for receiving and scaling the second bipolar signal, the second scaling means having first and second outputs,
  (3) a first comparator having first and second inputs, the first input comparator being connected to the first output of the first scaling means, and the second comparator input being connected to the second output of the second scaling means,
  (4) a second comparator having first and second inputs, the first input of the second comparator being connected to the first output of the second scaling means, and the second input of the second comparator being connected to the second output of the first scaling means, and
  (5) means, connected to the outputs of the first and second comparators, for converting the outputs therefrom into a unipolar signal;
c. conversion means including a data base with an address input for receiving the digital data of the identifier field and for outputting from the data base, in response to the identifier field, conversion data in units of engineering notation which are associated with the identifier field, the conversion means being responsive to the conversion data to convert the digital data field of the operating parameter into equivalent units of the engineering notation; and
d. output processing means for storing the converted operating parameter data in the equivalent units of engineering notation.

2. The apparatus as set forth in claim 1 wherein:
a. said first and second inputs of said first comparator are positive and negative inputs, respectively;
b. said first and second inputs of said second comparator are positive and negative inputs, respectively; and
c. said first and second bipolar signals are generally 180° out of phase.

3. The apparatus as defined in claim 2 including a positive voltage source and a negative voltage source and wherein:
a. said first scaling means includes (i) first and second series-connected resistors coupled to said positive voltage source and defining a first voltage divider wherein a juncture between said first and second series-connected resistors defines said first output of said first scaling means, and (ii), third and fourth series-connected resistors coupled to said negative voltage source and defining a second voltage divider wherein a juncture between said third and fourth series-connected resistors defines said second output of said first scaling means; and
b. said second scaling means includes (i) fifth and sixth series-connected resistors coupled to said positive voltage source and defining a third voltage divider wherein a juncture between said fifth and sixth series-connected resistors defines said first output of said second scaling means, and (ii), seventh and eighth series-connected resistors coupled to said negative voltage source and defining a fourth voltage divider wherein a juncture between said seventh and eighth series-connected resistors defines said second output of said second scaling means.

4. The apparatus as defined in claim 3 wherein:
a. said positive source is a value of +5 volts and said negative voltage source is a value of −5 volts; and,
b. each pair of said series connected resistors has a resistor ratio of approximately 6.5 to 1.

5. The apparatus as defined in claim 2 wherein said output converting means comprises flip flop means.

6. Apparatus for processing data which is in the form of communication words on a system bus, each communication word containing (i) an operating parameter field of digital data and (ii) an identifier field of digital data for identifying the operating parameter field, the apparatus comprising:
a. input means for entering a label field of digital data and providing a signal representative of the digital data at a first output;
b. input processing means in communication with the system bus and responsive to the first output for comparing the digital data of the label field with the digital data of the identifier field and for retrieving the communication word from the system bus when the identifier field corresponds to the label field;
c. conversion means including a data base with an address input for receiving the digital data of the identifier field and for outputting from the data base in response to the identifier field, conversion data in units of engineering notation which are associated with the identifier field, the conversion means being responsive to the conversion data to convert the digital data field of the operating parameter into equivalent units of the engineering notation,
  (1) the data base further including a plurality of cascaded memory devices $MD_1$, $MD_2$... $MD_n$ which are arranged so that (i) a data output of a preceding memory device provides an address input to a succeeding memory device, and (ii) the output from memory device $MD_n$ provides the conversion data for converting the operating parameter digital data into the engineering notation, the conversion data including units of the same engineering notation which are associated with more than one identifier field, and
  (2) the conversion means further include:
    (a) means for storing address data in memory devices $MD_1$ and $MD_2$ at addresses which correspond to the identifier fields in a manner that (i) the address data generates an address input to memory device $MD_n$ to access the conversion data stored therein, and (ii) those identifier fields identifying units of the same engineering data which are associated with more than one identifier field are caused to access common address data in memory devices $MD_1$ and $MD_2$, and (b) means for feeding a first portion of the identifier field as an address input to memory device $MD_1$ to generate a first portion of an address input to memory device $MD_2$ and for feeding the second portion of the identifier field to memory device $MD_2$ as a second portion of the address input to memory device $MD_2$, in order to generate the address input to memory device $MD_n$; and d. output processing means for storing the converted digital operating parameter data in the equivalent units of the engineering notation.

7. The apparatus as set forth in claim 6 wherein said output processing means includes display means for visually displaying said converted operating parameter data in the units of engineering notation.

8. The apparatus as defined in claim 7 wherein said output processing means comprises a display device for presenting the contents of the retrieved words in the form of alphanumeric images.

9. The apparatus as defined in claim 7, wherein said output processing means comprises a printing device for presenting the contents of the retrieved words in the form of alphanumeric images.

10. The apparatus as set forth in claim 6 wherein:
a. the conversion means further includes
   (1) means for storing in memory devide $MD_1$ a first higher order addres which includes the first portion of the address input to memory device $MD_2$;
   (2) means for storing in memory device $MD_1$ additional higher order addresses which correspond to the first higher order address, the first higher order address and the additional higher order addresses being stored at $MD_1$ addresses which are accessed by the identifier field which identifies the same engineering notation; and
b. the feeding means includes means for feeding a lower order address which comprises the second portion of the address input to memory device $MD_2$.

11. The apparatus as set forth in claim 10 wherein:
a. includes:
   (1) means for storing in memory device $MD_2$ a second higher order address portion of the address input to memory device $MD_n$,
   (2) means for storing in memory device $MD_2$ additional second higher order address portions which correspond to the second higher order address portion, the second higher address portion and the additional second higher order address portions being accessed by the identifier field which identifies the same engineering notation; and
b. the feeding means includes means for feeding a lower order address portion of the address input to memory device $MD_n$.

12. Apparatus for processing data which is in the form of communication words on a system bus, where the communication words are transmitted over the system bus in the form of bipolar signals which have either a first higher frequency of a second lower frequency, each communication word containing (i) an operating parameter field of digital data and (ii) an identifier field of digital data for identifying the operating parameter field, the apparatus comprising:

a. input means for entering a label field of digital data and providing a signal representative of the digital data at a first output;

b. input processing means in communication with the system bus and responsive to the first output for comparing the digital data of the label field with the digital data of the identifier field and for retrieving the communication word from the system bus when the identifier field corresponds to the label field, the input processing means further including:
   (1) means for converting the bipolar signals into unipolar signals and
   (2) means for generating a signal which is a function of the frequency of the communication word on the system bus in order to synchronize the retrieval of the communication word from the bus, the synchronizing signal generating means including:
      (a) charge storage means for storing the charge of the unipolar signal,
      (b) resistor means in communication with the charge storage means for regulating a discharge rate of the charge from the charge storage means between unipolar signals, the charge discharge causing a change in the level of charge in the charge storage means,
      (c) means for further regulating the discharge rate of the charge storage means by bypassing a predetermined portion of the resistor means when the unipolar signals are transmitted at the first higher frequency so as to increase the discharge rate of the charge storage means, and
      (d) means for detecting the charge level of the charage storage means and for generating the synchronizing signal when a selected charge level is reached in order to indicate an end of one of the communication words;

c. conversion means including a data base with an address input for receiving the digital data of the identifier field and for outputting from the data base, in response to the identifier field, conversion data in units of engineering notation which are associated with the identifier field, the conversion means, being responsive to the conversion data to convert the digital data field of the operating parameter into equivalent units of the engineering notation; and d. output processing means for storing the converted digital operating parameter data in the equivalent units of engineering notation.

13. The apparatus as defined in claim 12 wherein:
a. said resistor means includes a first resistor which is connected to an output of said energy storage means, and a second resistor which is connected to said first resistor at a first junction; and
b. said further regulating means includes switch means which are connected to said first junction and which switch said first junction into communication with a discharge path when the unipolar signals of the communication word are transmitted at the higher frequency, the discharge path having a lower resistance than said second resistor.

14. Apparatus for retrieving data which is in the form of communication words on a system bus, each communication word containing (i) an operating parameter field of digital data and (ii) an identifier field of digital data for identifying the operating parameter field, the apparatus comprising:

a. input means for entering a label field of digital data and providing a signal representative of the digital data at a first output;

b. input processing means in communication with the system bus and responsive to the first output for comparing the digital data of the label field with the digital data of the identifier field and for retrieving the communication word from the system bus when the identifier field corresponds to the label field;

c. conversion means including a data base with an address input for receiving the digital data of the identifier field and for outputting from the data base, in response to the identifier field, conversion data in units of engineering notation which are associated with the identifier field, the conversion means being responsive to the conversion data to convert the digital data field of the operating parameter into equivalent units of the engineering notation;

d. output processing means for storing the converted digital operating parameter data in the equivalent units of the engineering notation; and e. means for measuring a time interval between successive retrieved communication words, the interval measuring means being in communication with the input processing means and being responsive to an output signal from the input processing means when the communication word is retrieved from the system bus, the interval measuring means including counter means having a least significant byte counter and a most significant byte counter which are clocked to measure the time interval between successive output signals in least significant and most significant bytes, the interval measuring means further including (i) means for outputting the most significant and least significant bytes from the counter means in response to the output signal, and (ii) means for disabling the counter means when the least significant byte is outputted from the least significant byte counter, and means for resetting and reenabling the counter means when the most significant byte is outputted from the most significant byte counter.

15. A method for processing a communication word, which contains digital data which defines a unique operating parameter, from a system bus which has a plurality of communication words thereon containing different operating parameter data, each communication word including an identifier field for identifying the operating parameter data contained in the communication word, the method comprising the steps of:

a. retrieving from the system bus the communication word by responding to the identifier field contained in the communication word;

b. providing a data base formed by a plurality of cascaded memory devices $MD_1$, $MD_2$ . . . $MD_n$ which are arranged so that (i) a data output of preceding memory device provides an address input to a succeeding memory device, and (ii) the output from memory devide $MD_n$ provides conversion data for converting the operating parameter data from a digital format into engineering notation, the conversion data including data which is common to more than one identifier field for use in converting operating parameter data identified by different identifier fields to engineering notation;

c. storing in memory devices $MD_1$ and $MD_2$, at an address which corresponds to the identifier field, address data for generating an address input to access the conversion data in memory device $MD_n$, and in a manner that identifier field which identifies operating parameters which are converted by the data which is common to more than one identifier field common address data in memory devices $MD_1$ and $MD_2$;

d. feeding (i) a first portion of the identifier field as an address input to memory device $MD_1$ to generate a first portion of an address input to memory devide $MD_2$, and (ii) a second portion of the identifier field to memory device $MD_2$ as a second portion of the address input to memory device $MD_2$, in order to generate the address input to $MD_n$;

e. outputting conversion data, in response to the address input to memory device $MD_n$, for defining the operating parameter data identified by the identifier field, and converting the operating parameter data into the engineering notation; and f. displaying the converted data in the engineering notation.

* * * * *